(12) United States Patent
Enomoto

(10) Patent No.: US 6,567,615 B2
(45) Date of Patent: May 20, 2003

(54) CAMERA PROVIDED WITH TREMBLE DETECTING FUNCTION

(75) Inventor: Shigeo Enomoto, Tokyo (JP)

(73) Assignee: Pentax Corporation, Tokyo (JP)

(*) Notice: Subject to any disclaimer, the term of this patent is extended or adjusted under 35 U.S.C. 154(b) by 0 days.

(21) Appl. No.: 10/091,477

(22) Filed: Mar. 7, 2002

(65) Prior Publication Data
US 2002/0127011 A1 Sep. 12, 2002

(30) Foreign Application Priority Data

Mar. 8, 2001 (JP) ........................................ 2001-064424

(51) Int. Cl.[7] .............................................. G03B 17/00
(52) U.S. Cl. ...................................................... 396/52
(58) Field of Search ...................... 396/52; 348/208.16, 348/208.99

(56) References Cited

U.S. PATENT DOCUMENTS 5,060,007 A * 10/1991 Egawa ........................ 396/52
5,740,470 A * 4/1998 Kitagawa et al. ............ 396/52
5,790,490 A * 8/1998 Satoh et al. .................. 396/52
5,835,798 A * 11/1998 Kitagawa .................. 396/52 X

FOREIGN PATENT DOCUMENTS

JP 63-53529 3/1988 ........... G03B/17/18
JP 11-95307 4/1999 ........... G03B/17/18

* cited by examiner

*Primary Examiner*—W. B. Perkey
(74) *Attorney, Agent, or Firm*—Greenblum & Bernstein, P.L.C.

(57) ABSTRACT

When an exposure of a film is started, the A/D conversion of angular speed signals output from the X-axis direction and Y-axis direction sensors and the storing of these digitalized angular speed signals to a memory are repeated at predetermined intervals. After the exposure time has elapsed, the A/D conversion and the storing are stopped, and the film is wound by one frame. Angular data are calculated by integrating the digitalized angular speed signals, and a tremble amount is calculated based on the angular data and a focal length of a photographing optical system. The tremble amount is compared with a permissible amount. If the tremble amount exceeds the permissible amount, the exposure is repeated. The photographing is repeated until the tremble amount becomes less than or equal to the permissible amount.

9 Claims, 9 Drawing Sheets

CAMERA PROVIDED WITH TREMBLE DETECTING FUNCTION

BACKGROUND OF THE INVENTION

1. Field of the Invention

This invention relates to a camera provided with a function which detects a focused image tremble caused by a hand tremble and so on.

2. Description of the Related Art

When an object is photographed by a camera held by the hands of a user, a tremble of a focused image of the object may occur. This is a phenomenon in which an image focused on a film is trembled due to a hand tremble of the user. It can be confirmed by checking a developed picture whether the focused image tremble has occurred or not. Considering that a focused image tremble is mostly caused by the hand tremble of a user, the probability of occurrence of the focused image tremble becomes higher, the longer the focal length of a photographing optical system and the longer the exposure time.

Generally, for a camera requiring 35 mm (millimeter) formatted film, it is known from empirical data that if the shutter speed (exposure time) is faster(shorter) than the reciprocal of the focal length of the photographing optical system, the probability of the occurrence of the tremble in a developed picture is reduced to an extent so as to be negligible.

For example, if the focal length of a photographing optical system is 60 mm (millimeter), this probability becomes extremely small when the exposure time value is shorter than 1/60 of a second. Also, if the focal length is 250 mm, the probability becomes extremely small when the exposure time value is shorter than 1/250 of a second.

Similarly, in a digital camera provided with an imaging sensor, for example a CCD, the probability of tremble can be controlled by adjusting the relationship between the focal length and the exposure time. Note that, in general, for a digital camera, the focal length as that of the camera for a 35 mm formatted film. However, the actual focal length is determined to be based on the size of the CCD. Further, the exposure time corresponds to a charge store period.

However, the extent of the hand tremble basically depends upon the skill of the user, and the extent can be further affected by the photographing conditions. When a skilled photographer takes a picture, even if a exposure time longer than the reciprocal of the focal length is set, it often happens that a picture in which no tremble occurs is obtained. Further, even if the same user photographs using the same camera under the same conditions, tremble sometimes occurs and sometimes does not occur.

It can not be confirmed until the picture is developed whether the tremble occurred or not. In other words, the user understands that a tremble has occurred, after the photographing has been carried out. Accordingly, there is the problem that, in most cases, the user can not photograph the same object under the same conditions, and a good opportunity for a photograph was lost.

SUMMARY OF THE INVENTION

Therefore, an object of the present invention is to obtain a picture in which no tremble occurs, regardless of the skill of the user or the photographing conditions.

In accordance with an aspect of the present invention, there is provided a camera provided with a function which detects a tremble of a focused image comprising: a detector that detects a tremble amount of an optical axis of a photographing optical system; a tremble judging processor that judges, during a photographing period, if the tremble amount detected by the detector exceeds a predetermined permissible tremble amount; and a continuously shooting performance processor that automatically and repeatedly carries out a photographing until the tremble judging processor judges that the tremble amount detected by the detector is less than or equal to the predetermined permissible tremble amount.

Preferably, the camera further comprises a continuously shooting performance stopping processor that stops the automatic performance of photographing carried out by the continuously shooting performance processor even if the amount of tremble detected by the detector continues to exceed the permissible tremble amount.

Preferably, the camera further comprises a number of times setting mechanism that sets the number of times photographing is carried out by the continuously shooting performance processor.

Preferably, the camera further comprises an informing processor which informs a user that the judging processor judges that the tremble amount exceeds the permissible tremble amount.

Preferably, the detector comprises: angular speed sensors that detects an angular speed of the tremble of the optical axis of the photographing optical system; and a calculator of an angular of tremble that calculates angular data of tremble of the optical axis by integrating the angular speed detected by the angular speed sensors.

Optionally, the camera comprises a photosensitive medium as a photographing medium. The photographing period corresponds to an exposure period of the photosensitive medium.

Optionally, the camera comprises an imaging sensor as a photographing medium. The photographing period corresponds to a charge storing period of the imaging sensor. Further, the predetermined permissible tremble amount is set based on the pitch size of pixel of the image sensor.

According to the present invention, until it is confirmed that the amount of the focused image tremble detected during an exposure period is less than or equal to the permissible tremble amount, the photographing is repeated, namely the continuously shooting performance is carried out. Accordingly, it is ensured that a picture, in which no tremble has occurred, can be obtained, being independent of the skill of the user and the photographing conditions.

By providing the number of times setting mechanism, it becomes possible to set the times of the continuously shooting performance based on the extent of the skill of the user, or on an economical standpoint, for example, the amount of film which is able to be used, or on the photographing conditions, and soon. Accordingly, the waste of the photographing medium can be reduced and it is economical.

If the in forming processor is provided, the user is always informed that, a picture in which no tremble has occurred has not yet been obtained, even if the remaining frames of the film or the remaining amount of the photographing medium is limited, or the times of the photographing has reached the times set by the number of times setting mechanism before obtaining a picture in which no tremble has occurred. Accordingly, the user can judge at that time if it is necessary to take a photograph again, so that the opportunity for a photograph is not lost.

Further, by providing the number of times setting mechanism, the continuously shooting performance stopping processor, and the informing mechanism together, when a picture in which no tremble occurs is obtained before the number of times of photographing which were carried out becomes equal to the set number of times of photographing, the user is informed that the picture has been obtained, so that further photographing can be stopped depending on the intent of the user. Accordingly, in order to obtain a picture in which no tremble occurs, the number of frames or the capacity of a recording medium can be kept to the minimum, so that it is economical.

BRIEF DESCRIPTION OF THE DRAWINGS

The objects of the present invention will be better understood from the following description, with reference to the accompanying drawings, in which.

DESCRIPTION OF THE PREFERRED EMBODIMENTS

The present invention will now be described with reference to embodiments shown in the drawings. Note that, in this specification, when a user holds a camera in a usual manner, the horizontal direction is referred to as a "lateral direction (X-axis direction)", and the vertical direction is referred to as a "lengthwise direction (Y-axis direction)".

Figure 1:
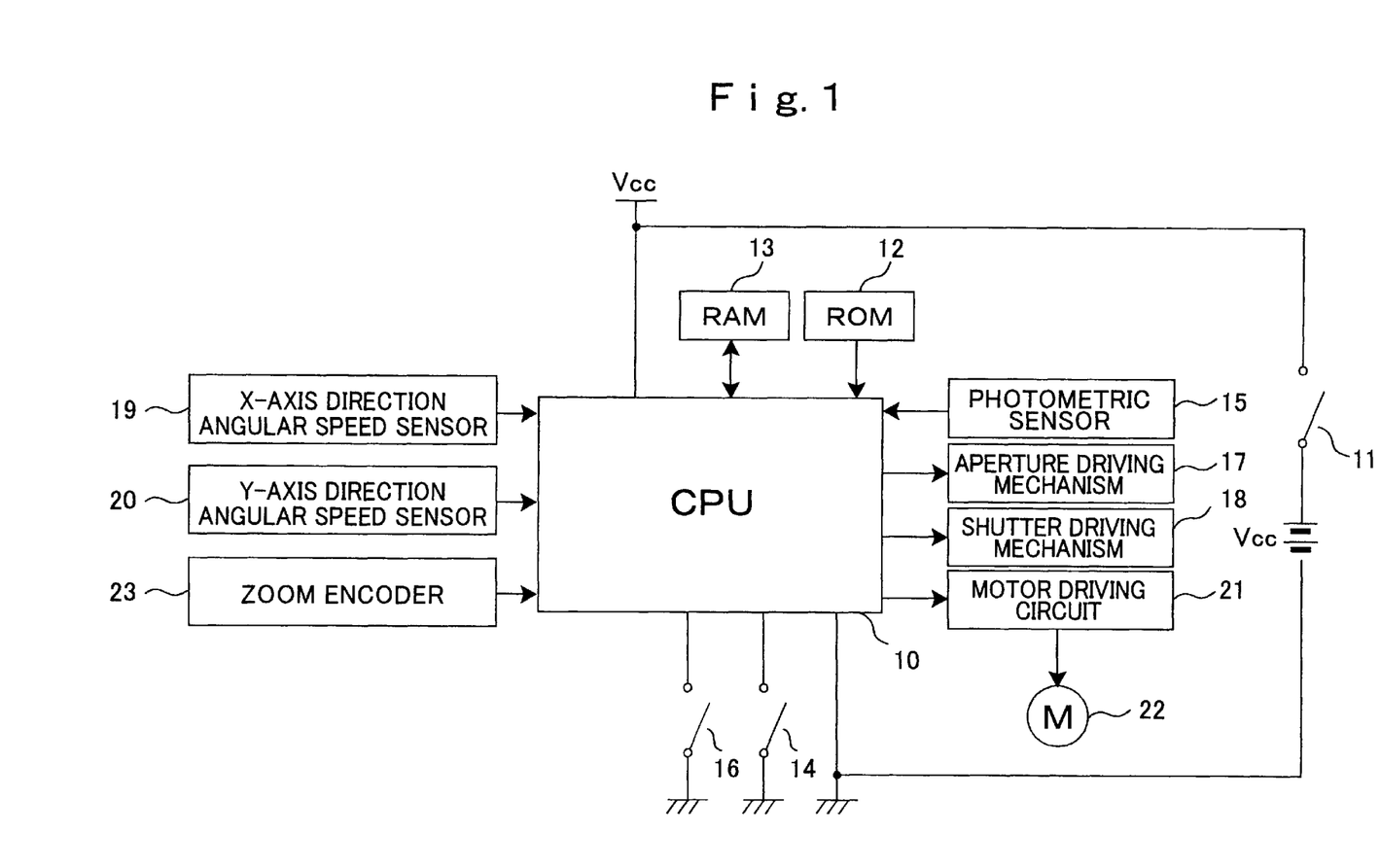
FIG. 1 is a block diagram of a still camera to which a first embodiment according to the present invention is applied.

FIG. 1 is a block diagram of a still camera to which a first embodiment, according to the present invention, is applied.

A system controller, for example a micro computer, having a CPU 10, wholly controls the still camera. Electric power is supplied from a direct-current power supply Vcc to the CPU 10. Start and stop of the electric power supply is controlled by manipulating a main switch 11 which is placed at a predetermined position on the outer surface of the still camera. A ROM (Read Only Memory) 12 and a RAM (Random-Access Memory) 13 are connected to the CPU 10. In the ROM 12, programs for performing various routines, invariables, and so on are stored. In the RAM 13, temporary data is stored.

A shutter button (not shown), which can be pushed in two steps, is placed at a predetermined position on the outer surface of the still camera. When the shutter button is pushed to the first step, a photometry switch 14 is turned on and a photometric operation is started under the control of the CPU 10. The CPU 10 calculates an exposure value (Ev) based on the output signal from a photometric sensor 15. An aperture value (Av) and an exposure time (Tv), which are necessary for photographing, are calculated based on the exposure value.

When the shutter button is pushed to the second step, a release switch 16 is turned on, a release sequence is started in the CPU 10. Driving signals are respectively output to an aperture driving mechanism 17 and a shutter driving mechanism 18, in accordance with the Av and the Tv calculated in the above-mentioned photometric operation. An exposure control of a film is carried out by driving the aperture driving mechanism 17 and the shutter driving mechanism 18, and an object image is recorded on the film. Note that, since the structures of the aperture driving mechanism 17 and the shutter driving mechanism 18 are already well known, the explanation will be omitted in this specification.

An X-axis direction angular speed sensor 19 is a sensor for detecting the angular speed of an optical axis of a photographing optical system in the lateral direction, that is, in an axis direction corresponding to the horizontal direction when the still camera is held in the usual manner. A Y-axis direction angular speed sensor 20 is a sensor for detecting the angular speed of the optical axis in the lengthwise direction, that is, in an axis direction corresponding to the vertical direction when the still camera is held in the usual manner. For example, a gyro sensor is used as the X-axis and Y-axis direction angular speed sensors 19, 20.

A motor driving circuit 21 is connected to the CPU 10, and a winding motor 22, which winds the film by one frame, is connected to the motor driving circuit 21. In accordance with the control signal output from the CPU 10, the drive and stop of the winding motor 22 are carried out through the motor driving circuit 21.

Further, a zoom encoder 23 is connected to the CPU 10. The zoom encoder 23 is a pattern-contact type fixed in a zoom lens barrel which holds a zoom lens which is included in a photographing optical system. When a zoom ring is manually operated, a brush fixed on the zoom ring is moved being in slidable contact with the pattern-contact. Consequently, a digital signal corresponding to a focal length set by manual operation is output from the zoom encoder 23. In the ROM 12, a table containing data indicating the relation between the signals output from the zoom encoder 23 and the values of the focal lengths, is stored. The CPU 10 obtains a focal length based on the output signal of the zoom encoder 23 and the table in the ROM 12.

Note that, in the first embodiment, various functions of a camera, for example, focusing, zooming and so on, which are applied to the still camera of this embodiment, are already well known. Accordingly, such functions are not depicted in FIG. 1 and the explanations will be omitted.

Figure 2:
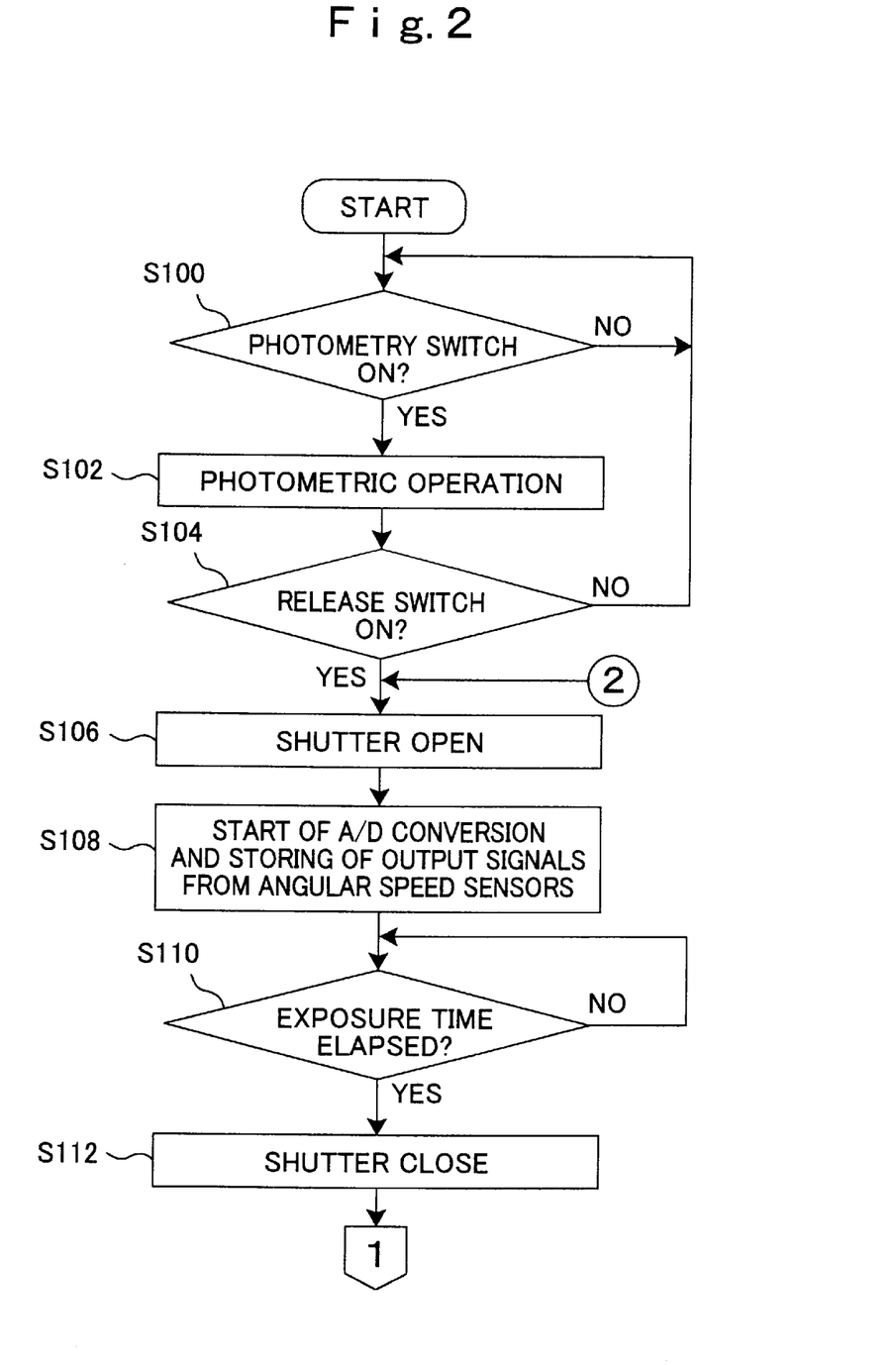
FIG. 2 is the first half of a flow chart which indicates processes of the photographing operation in the still camera of the first embodiment.
Figure 3:
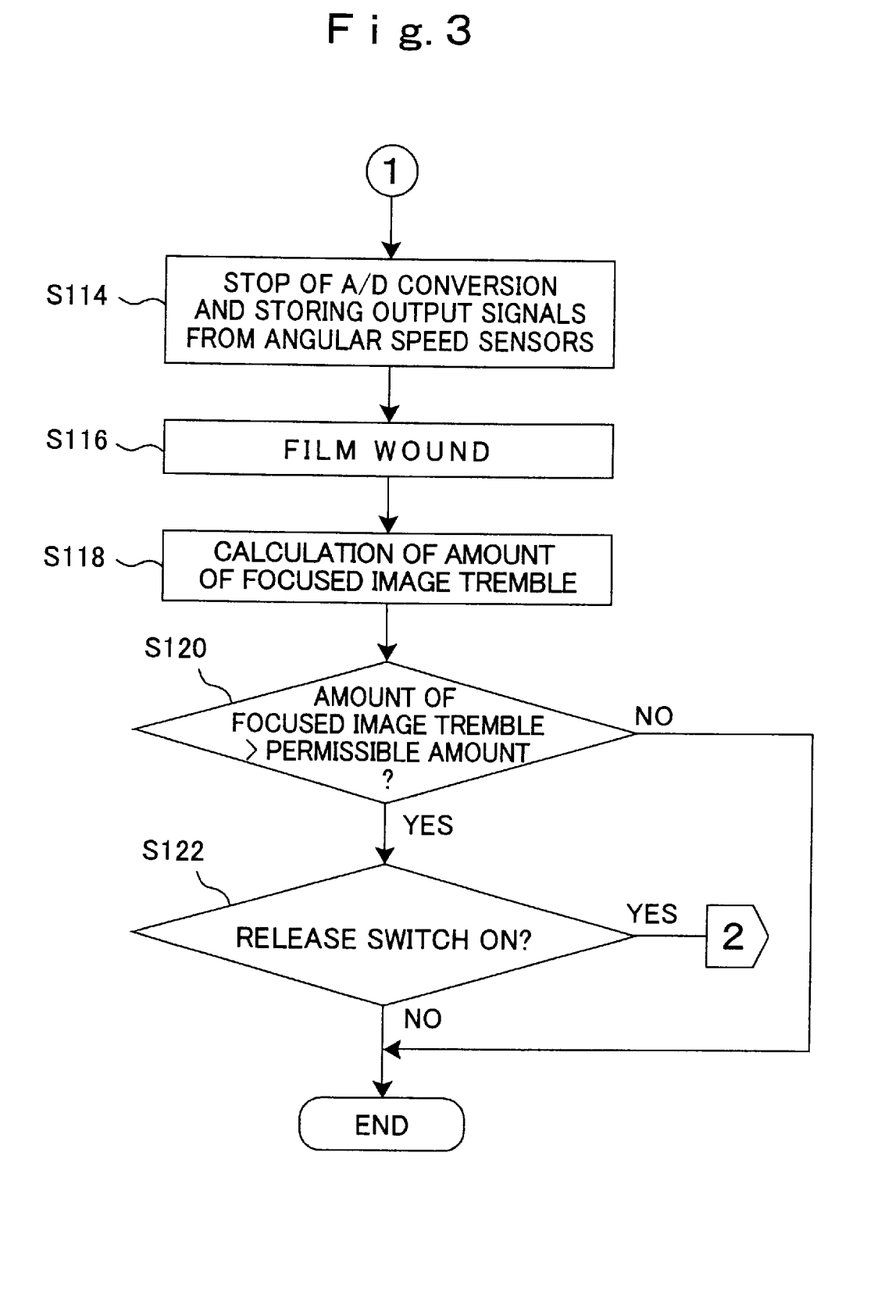
FIG. 3 is the latter half of the flow chart which indicates the processes of the photographing operation in the still camera of the first embodiment.

With reference to FIGS. 2 and 3, operating processes in the first embodiment will be explained. When the main switch 11 is manipulated and the electric power supply to the CPU 10 is started, the status of the photometry switch 14 is checked in step S100. If it is confirmed that the shutter button is pushed to the first step and the photometry switch 14 is turned on, the process goes to step S102. In step S102, the photometric operation is carried out, so that the Ev, the Tv, and the Av are calculated based on the output of the photometric sensor 15.

Then, in step S104, the status of the release switch 16 is checked. If it is confirmed that the shutter button has been pushed to the second step and the release switch 16 is turned on, the process goes to step S106. If it is confirmed hat the release switch is not turned on, the process returns to step S100, the above-mentioned operations are repeatedly performed.

In step S106, a control signal, which commands the opening of a shutter (not shown), is output from the CPU 10 to the shutter driving mechanism 18. Consequently, the shutter is opened and the exposure of the film is started. Next, in step S108, the A/D (analog/digital) conversion of the angular speed signals, output from the X-axis direction and Y-axis direction angular speed sensors 19 and 20, and the storing of the digitalized signals (digital data of angular speed) in the RAM 13 are started. Namely, the angular speed data of the optical axis of the photographing optical system are digitalized and stored in the RAM 13. The A/D conversion and the storing are repeatedly performed at a predetermined cycle, for example every one millisecond, during the exposure period.

In step S110, it is checked if the exposure time (Ev) calculated in step S102, has elapsed. This checking operation is repeatedly carried out at predetermined intervals until it is confirmed that the exposure time has elapsed. While the checking operation is being repeated, the A/D conversion of the output signals from the angular speed sensors 19 and 20, and the storing of the digitalized output signals in the RAM 13 are successively repeated.

If it is confirmed in step S110 that the exposure time has elapsed, the process goes to step S112. In step S112, a control signal which commands the close of the shutter is output from the CPU 10. Consequently, the shutter is closed and the exposure of the film is ended.

Next, the process goes to step S114 of FIG. 3. In step S114, the A/D conversion of the output signals from the sensors 19 and 20 and the storing of the digitalized signals in the RAM 13 are stopped. In step S116, a control signal, which commands the driving of the winding motor 22, is output from the CPU 10 to the motor driving circuit 21. Consequently, the winding motor 22 is driven and the film is wound by one frame in order to prepare for the next photographing operation.

Next, in step S118, the amount of the focused image tremble is calculated. First, the digital data of the angular speed in the X-axis and Y-axis directions, which are stored in the RAM 13, are integrated. As described above, during the exposure period, the angular speeds are repeatedly converted to digital data. Accordingly, with respect to the X-axis direction and the Y-axis direction, a plurality of angular speed data, which are digitalized, are stored in the RAM 13. The angular speed data are integrated in the order of the time they are detected, and the value of integration is calculated at each time when the A/D conversion is carried out. Namely, with respect to the X-axis direction and the Y-axis direction, angular data of the optical axis of the photographing optical system are calculated, corresponding to each timing of the A/D conversion during the exposure period.

The amount of the focused image tremble AT is calculated based on an expression (1) described below, using: the maximum value and minimum values of the angular data of each of the X-axis and Y-axis directions; the focal length of the photographing optical system obtained by the zoom encoder 23 and the table stored in the ROM 12; and the constant of proportion which is in inverse proportion to the sampling frequency of the A/D conversion.

$$AT = f \times s \times ((Xmax - Xmin)^2 + (Ymax - Ymin)^2)^{1/2} \qquad (1)$$

AT=Amount of focused image tremble f=focal length of the photographing optical system s=constant of proportion Xmax=maximum of angular data in X-axis direction Xmin=minimum of angular data in X-axis direction Ymax=maximum of angular data in Y-axis direction Ymin=minimum of angular data in Y-axis direction Namely, the amount of the focused image tremble, calculated by the expression (1), is the length of a diagonal line of a rectangle defined by of a tremble range, in the X-axis direction, of an image which is imaged on the film during the exposure period, and the tremble range of the image in the Y-axis direction.

In step S120, the amount of the focused image tremble AT, calculated in step S118, is compared with a predetermined permissible tremble amount. If it is confirmed that the amount of the focused image tremble during the exposure time is larger than the permissible tremble amount, the process goes to step S122. Note that, for example, if the camera is a camera for 35 mm (millimeter) formatted film, a value between 50 through 100 μm (micrometer) is set as the permissible tremble amount.

Next, in step S122, a status of the release switch 16 is checked. If it is confirmed that the shutter button is still being pushed to the second step and the release switch 16 is still ON, the process returns to step S106 of FIG. 2 and the shutter is opened again to start the photographing operation. If it is confirmed in step S122 that the release switch 16 is OFF, the process is ended.

On the other hand, if it is confirmed in step S120 that the amount of the focused image tremble AT, calculated in step S118, is less than or equal to the permissible tremble amount, the process is ended, without performing step S122.

As described above, in the first embodiment, while the user is pushing the shutter button such that the release switch 16 is kept ON, the photographing operation and the checking procedure for focused image tremble during photographing are automatically and repeatedly performed, until a picture, in which a focused image tremble does not occur, is photographed. If a picture in which no tremble occurs has been photographed, or if the shutter button is released by the user (if the release switch is turned OFF), the automatic performance of the photographing operation is stopped. Note that, in this specification, the automatic and repeated performance of the photographing operation is called the "continuously shooting performance".

Figure 4:
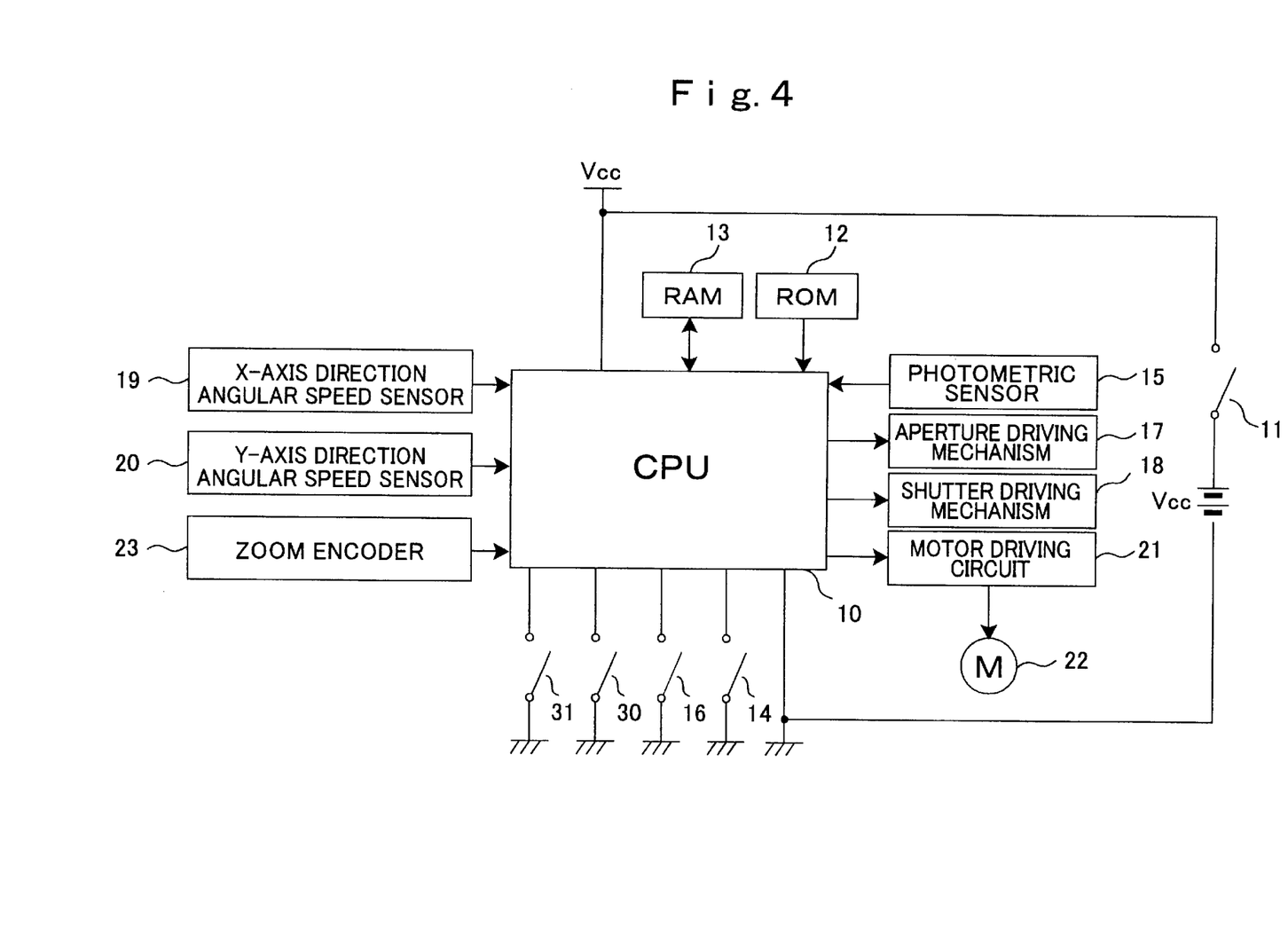
FIG. 4 is a block diagram of a still camera to which a second embodiment according to the present invention is applied.

FIG. 4 is a block diagram of a still camera to which a second embodiment, according to the present invention, is applied. In FIG. 4, components utilized in FIG. 1, which are identical in FIG. 4, share the same reference numerals. As depicted in FIG. 4, an UP-switch 30 and a DOWN-switch 31 are connected to the CPU 10. The UP-switch 30 and the DOWN-switch 31 are used for setting an upper bound of times of the continuously shooting performance. The UP-switch 30 and the DOWN-switch 31 are respectively turned ON or OFF, in accordance with the manipulation of an UP-button and a DOWN-button which are placed at predetermined positions on the outer surface of the still camera. While the UP-button and the DOWN-button are not being pressed, the UP-switch 30 and the DOWN-switch 31 are OFF. If the UP-button is pressed by the user, the UP-switch 30 is turned ON, and a signal, which commands an increase in the number of times of the continuously shooting performance by one time, is input to the CPU 10. Similarly, if the DOWN-button is pressed by the user, the DOWN-switch 31 is turned ON, and a signal, which commands a decrease in the number of times of the continuously shooting performance by one time, is input to the CPU 10. Namely, the user can freely set the number of times of the continuously shooting performance in accordance with his or her skill at photographing.

Figure 5:
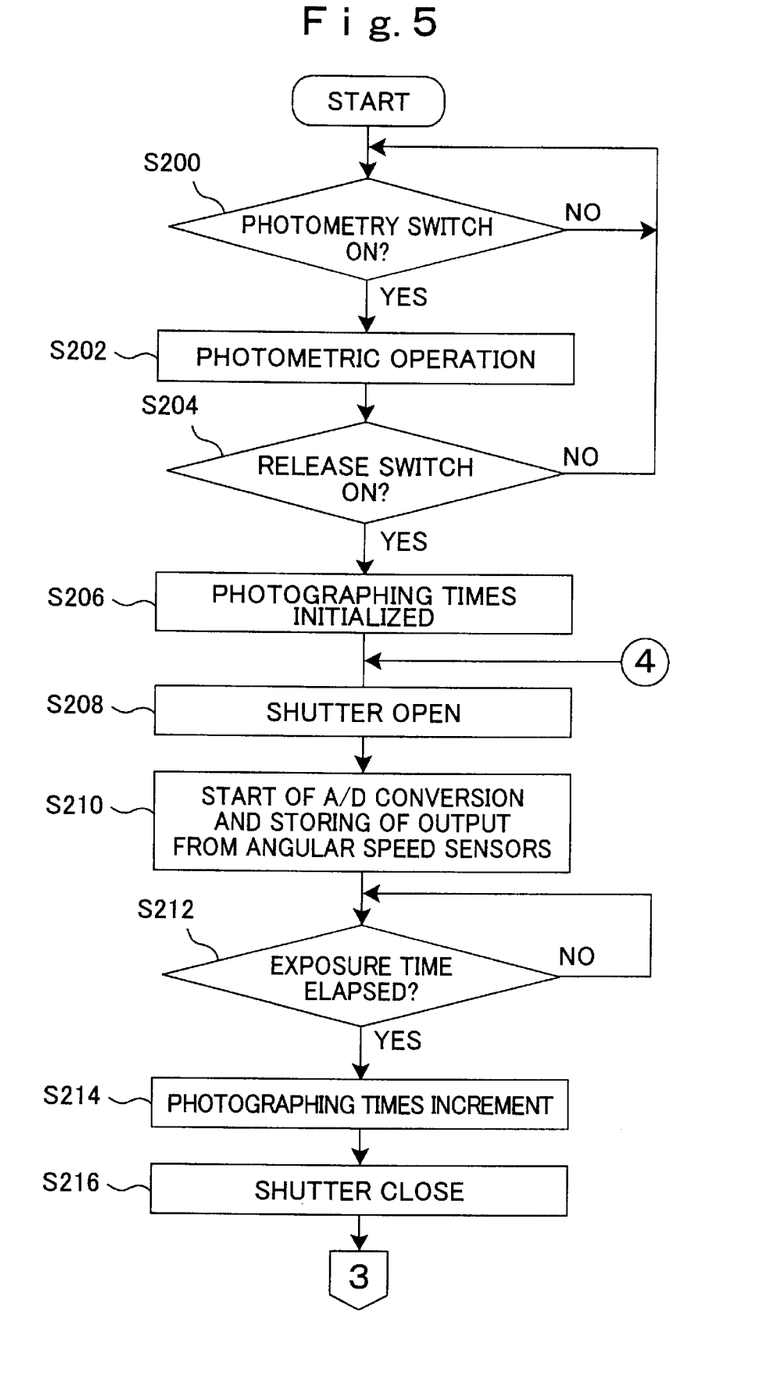
FIG. 5 is the first half of a flow chart which indicates the processes of the photographing operation in the still camera of the second embodiment.
Figure 6:
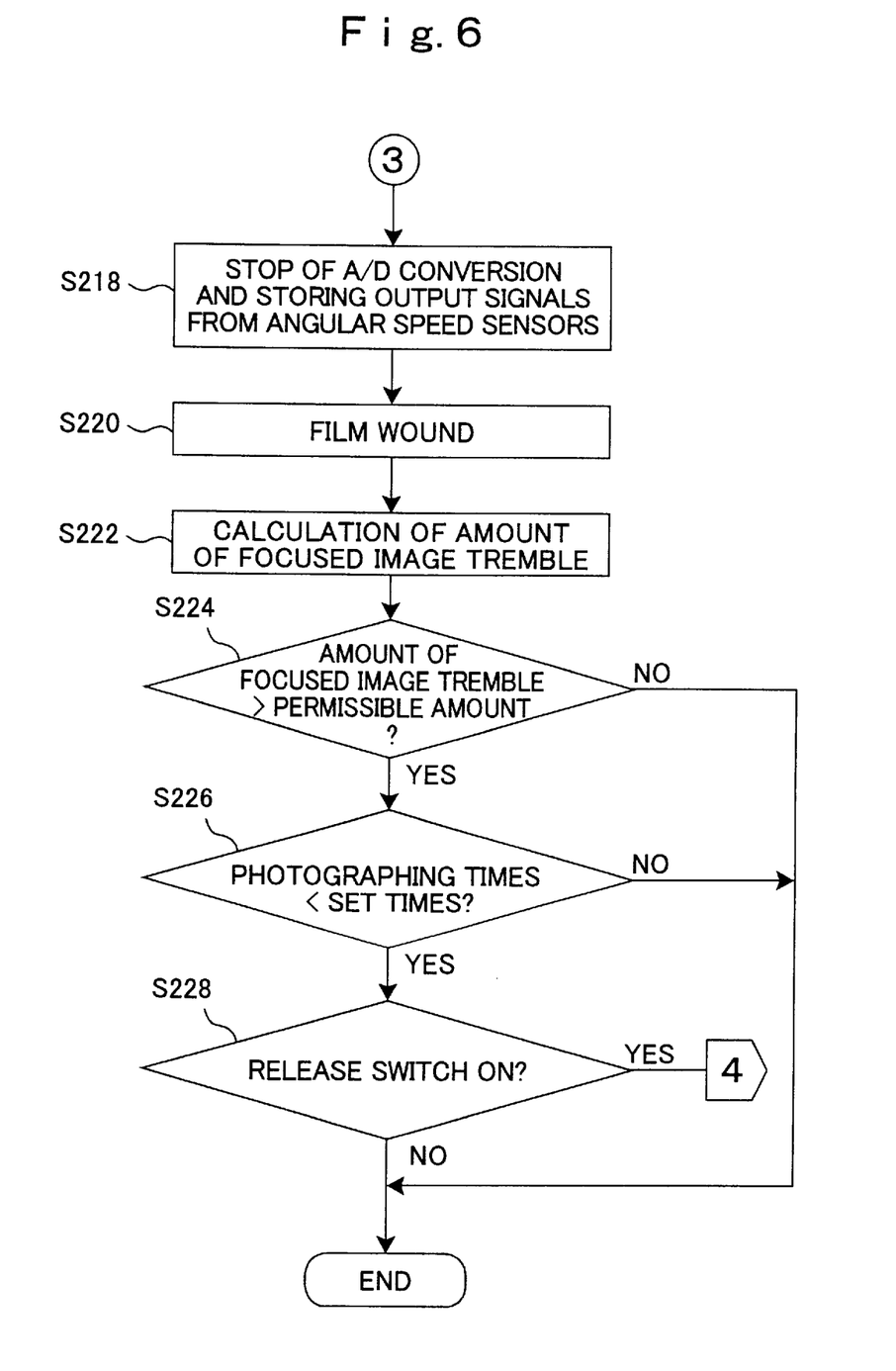
FIG. 6 is the latter half of the flow chart which indicates the processes of the photographing operation in the still camera of the second embodiment.

FIGS. 5 and 6 show a flow chart which indicates the operating processes of photographing in the still camera of the second embodiment. In the processes from steps S200 through S204, similar operations to those in steps S100 through S104 of FIG. 2 are carried out. The status of the photometry switch 14 and release switch 16 is checked (S200 and S204), and the photometric operation is carried out (S202). In step S204, if it is confirmed that the release switch is ON, the process goes to step S206. In step S206, "0" is set to a variable N, which indicates the number of times that photographing will be carried out in the continuously shooting performance, so that the variable N is initialized.

Next, from steps S208 through S212, similar operations to those in steps S106 through S110 are carried out. Namely, the control signal, which commands the opening of the shutter, is output from the CPU 10 and input to the shutter driving mechanism 18, so that the exposure is started (S208); the A/D conversion of the output signals in the X-axis direction and Y-axis direction angular speed sensors 19 and 20, and the storing of the digitalized signals in the RAM 13 are started (S210); and it is checked if the exposure time, calculated in step S202, has elapsed (S212). If it is confirmed in step S212 that the exposure time has elapsed, the process goes to step S214. In step S214, the variable N is incremented by "1".

Next, the process goes to step S218 in FIG. 6. Operations performed in steps S218 through S222 are similar to those of steps S114 through S118 of FIG. 3. Namely, the above-mentioned A/D conversion and storing in the RAM 13 are stopped (S218); the film is wound by one frame (S220); the amount of the focused image tremble is calculated based on the digitalized angular speed data which are stored in the RAM 13 and the focal length (S222). Note that, the focal length is obtained based on the data obtained by the encoder 23 and the table stored in the ROM 12, as described before.

In step S224, the amount of the focused image tremble calculated in step S222 is compared with the permissible tremble amount. If it is confirmed that the tremble amount AT is larger than the permissible tremble amount, the process goes to step S226. In step S226, the value of the variable N, namely the number of times of the photographing which was actually carried out is compared with the number of times of the continuously shooting performance set by the user through the UP-switch 30 and the DOWN-switch 31. If it is confirmed that the number of times of the photographing is smaller than the set number of times of the continuously shooting performance, the process goes to step S228. In step S228, the status of the release switch 16 is checked. If it is confirmed that the shutter button is being pushed to the second step and the release switch 16 is ON, the process returns to step S208 of FIG. 5, and the photographing is carried out again.

If it is confirmed in step S224 that the amount of the focused image tremble AT is less than or equal to the permissible tremble amount, the process is ended without performing the operations of steps S226 and S228. Further, if it is confirmed in step S226 that the number of times of photographing which had been carried out, reached the set number of times of the continuously shooting performance, the process is ended without performing the operation in step S228. Further, if it is confirmed in step S228 that the release switch is OFF, the process is ended without repeating the photographing.

As described above, in the second embodiment, it is similar to the first embodiment in that while the shutter button is pushed to the second step (while the release switch 16 is ON), the continuously shooting performance is carried out until the amount of the focused image tremble becomes less than or equal to the permissible tremble amount. However, even if the amount of the focused image tremble AT is larger than the permissible tremble amount, the continuously shooting performance is ended after the number of times of photographing reaches the number of time of the continuously shooting performance set by the user through the UP-button and the DOWN-button. Note that, the second embodiment is similar to the first embodiment in that the continuously shooting performance is ended if the shutter button is released.

Figure 7:
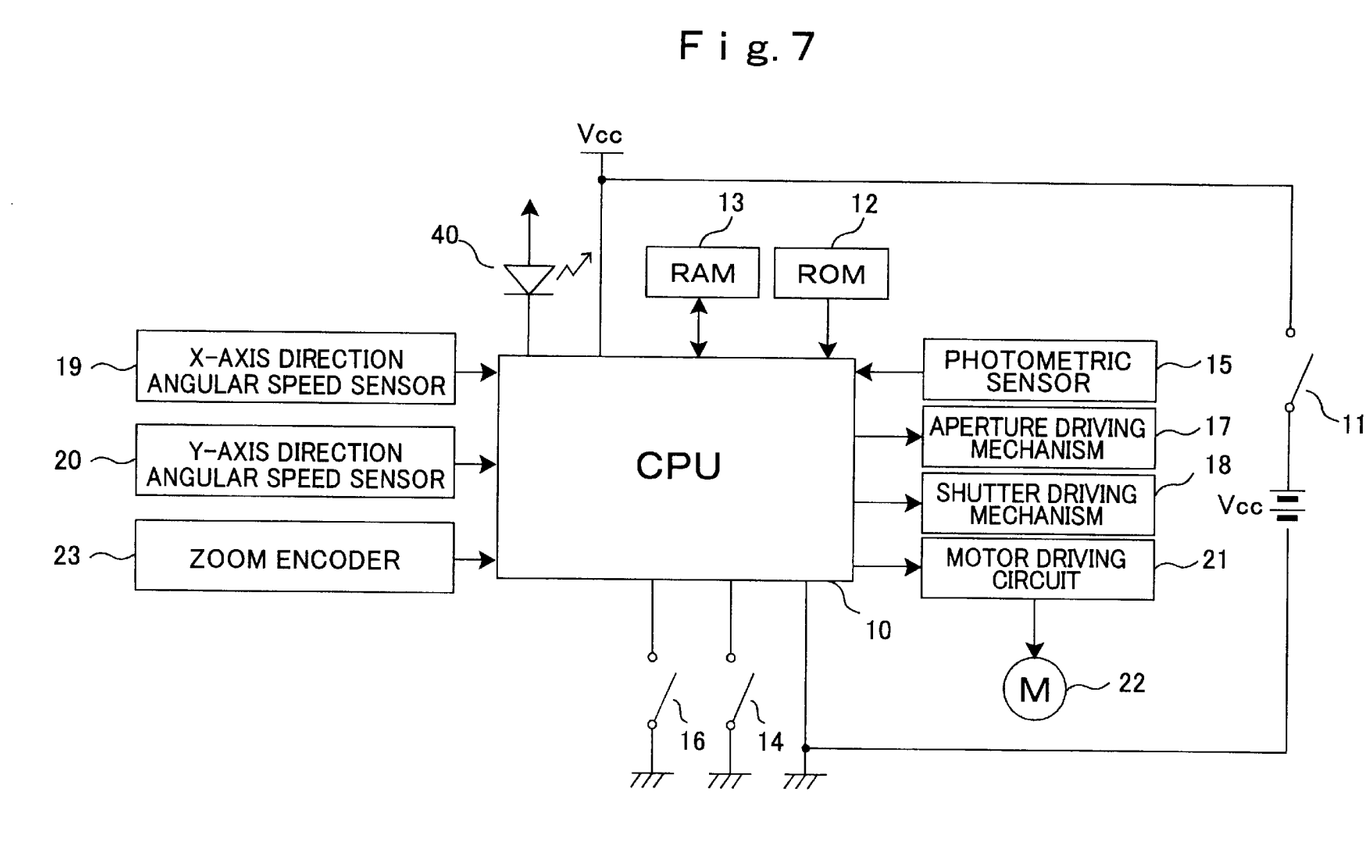
FIG. 7 is a block diagram of a still camera to which a third embodiment according to the present invention is applied.

FIG. 7 is a block diagram of a still camera to which a third embodiment, according to the present invention, is applied. In FIG. 7, components identical to those utilized in FIG. 1 share the same reference numerals. As depicted in FIG. 7, an LED (Light Emitting Diode) 40 is connected to the CPU 10. The LED 40 is provided for informing the user that a focused image tremble is occurring. The LED 40 is positioned in the still camera such that when the user looks through the finder of the still camera, the user can check whether the LED 40 is turned on or off.

Figure 8:
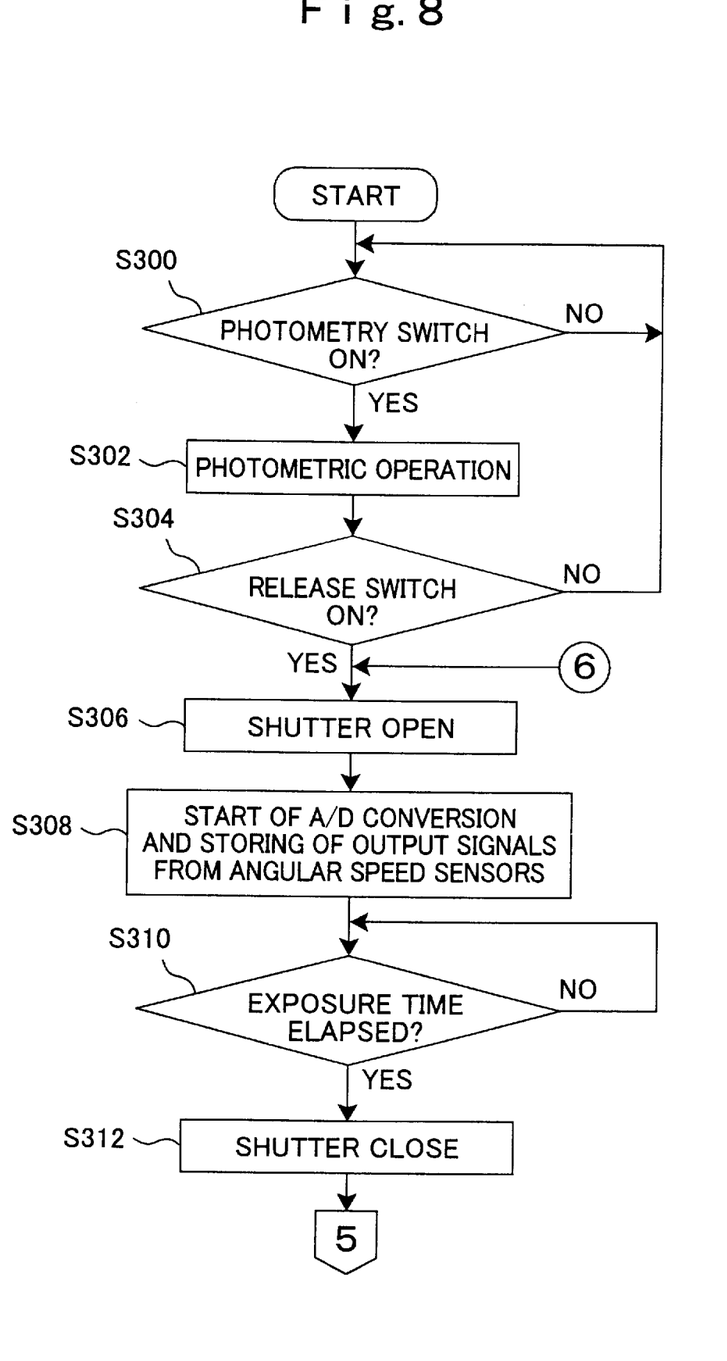
FIG. 8 is the first half of a flow chart which indicates the processes of the photographing operation in the still camera of the third embodiment.
Figure 9:
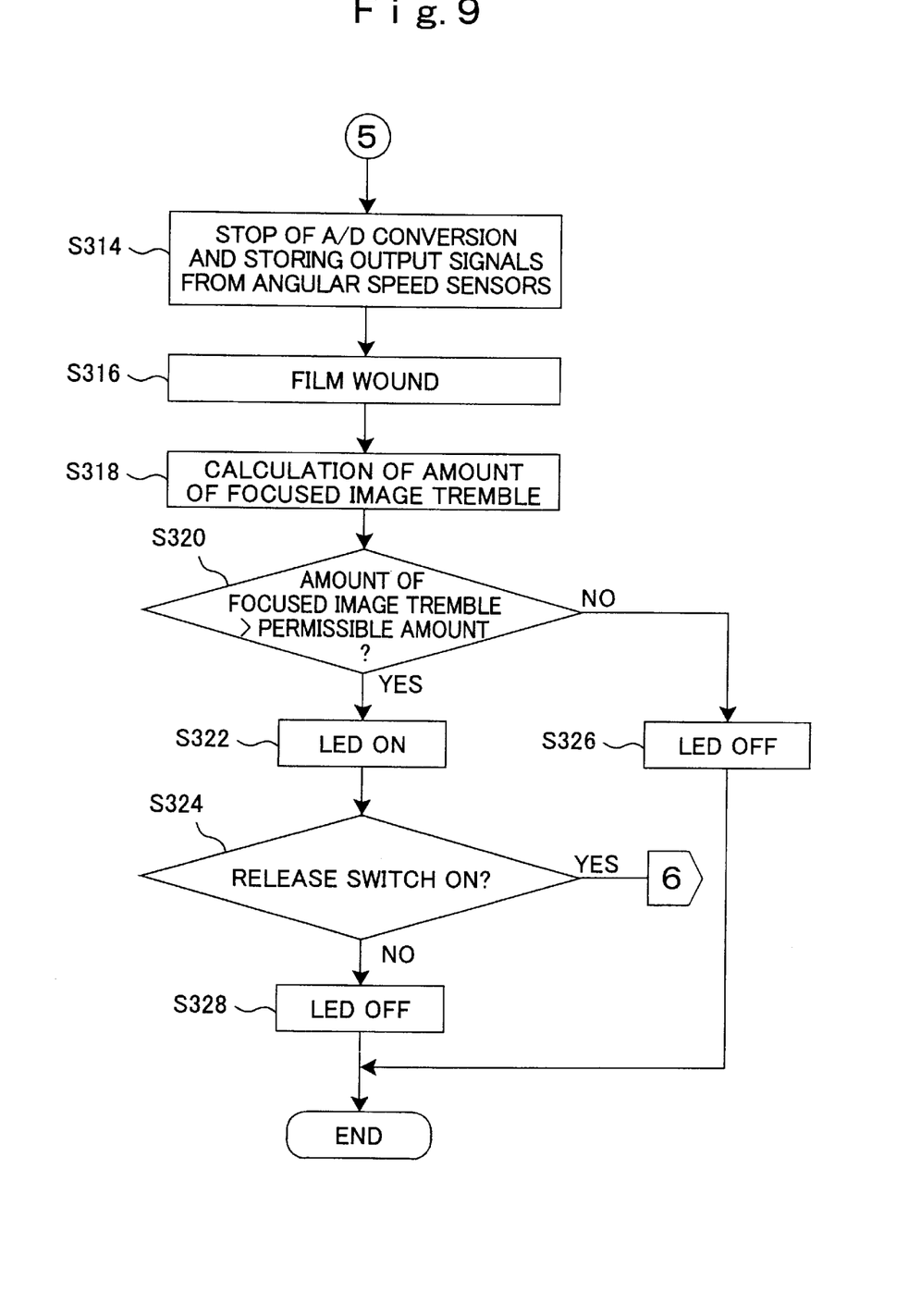
FIG. 9 is the latter half of the flow chart which indicates the processes of the photographing operation in the still camera of the third embodiment.

FIGS. 8 and 9 show a flow chart which indicates the operating processes of photographing in the still camera of the third embodiment. The processes in steps S300 through S312 of FIG. 8, and the processes in steps S314 through S320 of FIG. 9 are similar those in the first embodiment.

Namely, if the photometry switch 14 is turned ON (YES in S300), the photometric operation is carried out (S302); if the release switch 16 is turned ON (YES in S304), the exposure of the film is started (S306) and the A/D conversion of the output signal of the X-axis direction and Y-axis direction sensors 19 and 20, and the storing of digitalized output signals are started (S308).

Further, when the exposure time, calculated based the photometric operation of S302, has elapsed (YES in S310), the film is wound by one frame (S316), and the amount of the focused image tremble AT is calculated based on the digitalized angular speed data stored in the RAM 13 and the focal length (S318). Note that, the focal length is obtained based on data about focal length obtained by the zoom encoder 23 and the table recorded in the ROM 12. The amount of the focused image tremble AT, calculated in step S318, is compared with the predetermined permissible tremble amount in step S320.

If it is confirmed in step S320 that the amount of the focused image tremble AT exceeds the permissible tremble amount and tremble has occurred in the photographed picture, the process goes to step S322. In step S322, the LED 40 is turned ON. Next, the process goes to step S324, the status of the release switch 16 is checked. If it is confirmed that the release switch 16 is ON, the process returns to step S306 of FIG. 8, and the before-mentioned operations are repeated. On the other hand, if it is confirmed in step S320 that the amount of the focused image tremble AT is less than or equal to the permissible tremble amount and tremble has not occurred in the photographed picture, the process goes to step S326. In step S326, the LED 40 is turned OFF, and the process is ended. In step S324, if it is confirmed that the release switch 16 is not ON (i.e. the release switch 16 is OFF state), the LED 40 is turned OFF in step S328 and the process is ended.

As described above, in the third embodiment, if the amount of the focused image tremble during the exposure period exceeds the predetermined permissible tremble amount, the LED 40 is turned on in the finder, so that the user is informed that a tremble has occurred in the picture which is developed. While the status, where the amount of the focused image tremble exceeds the permissible tremble amount is continuing, the continuously shooting performance is being performed and the LED 40 is being kept ON.

Note that, the second and third embodiments can be combined to form one embodiment in which the number of times of the continuously shooting performance can be decided by the user and the user is informed by the status of the LED 40 that a tremble has occurred.

Further, the first through third embodiments were explained using a still camera which is provided with a silver salt film, however these embodiments are not restricted to still cameras. The embodiments can be applied to digital cameras in which an image sensor, for example, a CCD (Charge Coupled Device) is provided as an imaging medium. When the embodiments are applied to a digital camera, the period, in which the amount of the focused image tremble is calculated, corresponds to, for example, the charge store period of the imaging sensor such as a CCD.

In the digital camera, an optical low pass filter is included in the optical path of the photographing optical system. Accordingly, when the before-mentioned embodiments are applied to a digital camera, the permissible tremble amount is set to be about two times the pitch size of the CCD. Note that, the pitch size corresponds to the distance between contiguous photodiodes.

Furthermore, when the charge store of the imaging sensor is repeatedly performed, in a recording medium, the starting address for recording image data is appropriately shifted such that new image data do not overwrite image data which have already been recorded.

As described above, according to the present invention, a picture, in which a focused image tremble does not occur, can be obtained, being independent of the skill of the user and the photographing conditions.

The present disclosure relates to subject matter contained in Japanese Patent Application No.P2001-064424 (filed on Mar. 8, 2001) which is expressly incorporated herein, by reference, in its entirety.

What is claimed is:

1. A camera provided with a function which detects a tremble of a focused image comprises:
   a detector that detects a tremble amount of an optical axis of a photographing optical system;
   a tremble judging processor that judges, during a photographing period, if the tremble amount detected by said detector exceeds a predetermined permissible tremble amount; and
   a continuously shooting performance processor that automatically and repeatedly carries out a photographing until said tremble judging processor judges that the tremble amount detected by said detector is less than or equal to said predetermined permissible tremble amount.

2. A camera according to claim 1, further comprising a continuously shooting performance stopping processor that stops said automatic performance of photographing carried out by said continuously shooting performance processor even if the amount of tremble detected by said detector continues to exceed said permissible tremble amount.

3. A camera according to claim 1, further comprising a number of times setting mechanism that sets the number of times photographing is carried out by said continuously shooting performance processor.

4. A camera according to claim 1, further comprising an informing processor which informs a user that said judging processor judges that said tremble amount exceeds said permissible tremble amount.

5. A camera according to claim 1, wherein said detector comprises:
   angular speed sensors that detects an angular speed of the tremble of said optical axis of said photographing optical system; and
   a calculator of an angular of tremble that calculates angular data of tremble of said optical axis by integrating the angular speed detected by said angular speed sensors.

6. A camera according to claim 1, comprising a photosensitive medium as a photographing medium, wherein said photographing period corresponds to an exposure period of said photosensitive medium.

7. A camera according to claim 1, comprising an imaging sensor as a photographing medium, wherein said photographing period corresponds to a charge storing period of said imaging sensor.

8. A camera according to claim 7, wherein said predetermined permissible tremble amount is set based on the pitch size for pixels of said image sensor.

9. A camera provided with a function which detects a tremble of a focused image comprises:
   means for detecting a tremble amount of an optical axis of a photographing optical system;
   means for judging, during a photographing period, if the tremble amount detected by said detecting means exceeds a predetermined permissible tremble amount; and
   means for carrying out automatically and repeatedly a photographing until said judging means judges that the tremble amount detected by said detecting means is less than or equal to said predetermined permissible tremble amount.

* * * * *